W. H. WEBB.
CONTROLLING DEVICE FOR POWER TRANSMISSION CLUTCHES.
APPLICATION FILED FEB. 18, 1918.
1,374,413. Patented Apr. 12, 1921.
5 SHEETS—SHEET 1.
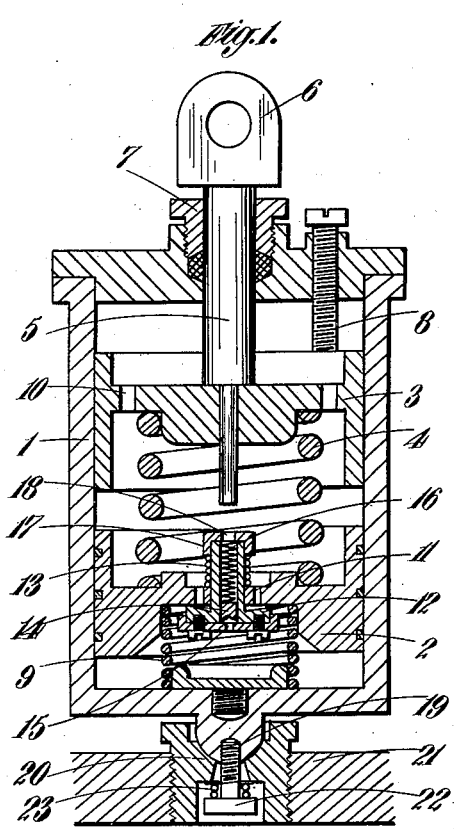
CLUTCH ENGAGED:
NORMAL POSITION.
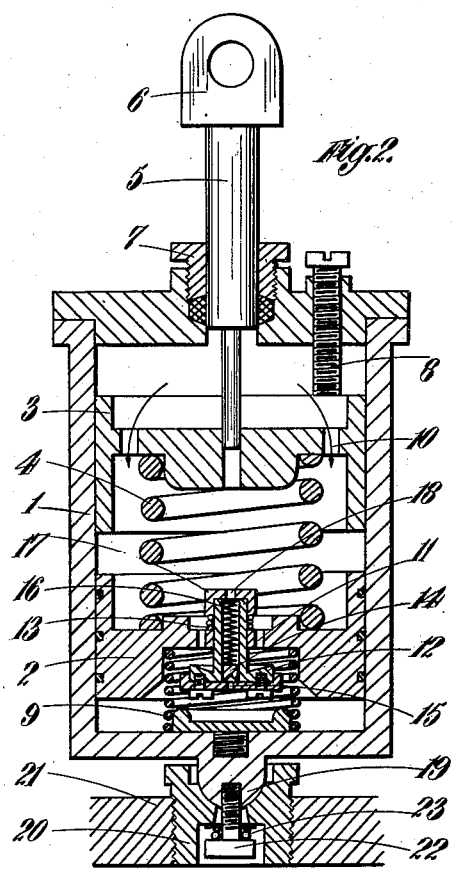
CLUTCH DISENGAGED:
PISTON RISING.
William Hubert Webb
INVENTOR
Attorney W. H. WEBB.
CONTROLLING DEVICE FOR POWER TRANSMISSION CLUTCHES.
APPLICATION FILED FEB. 18, 1918.
1,374,413.
Patented Apr. 12, 1921.
5 SHEETS—SHEET 2.
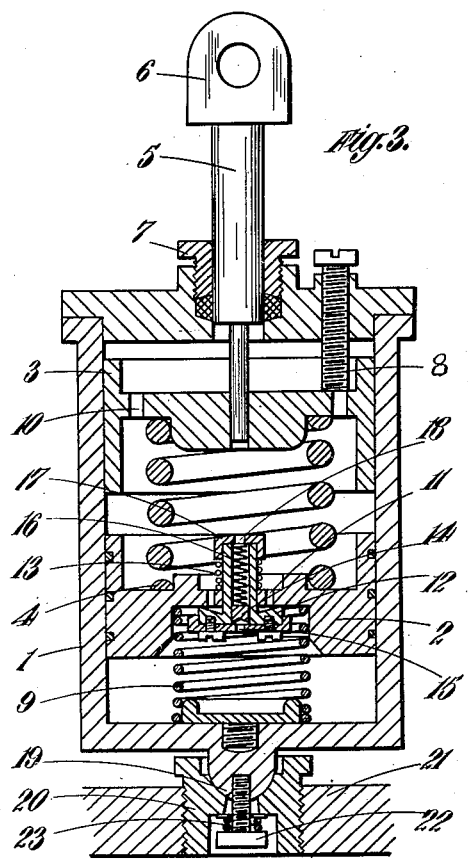
CLUTCH DISENGAGED;
PISTON ELEVATED.
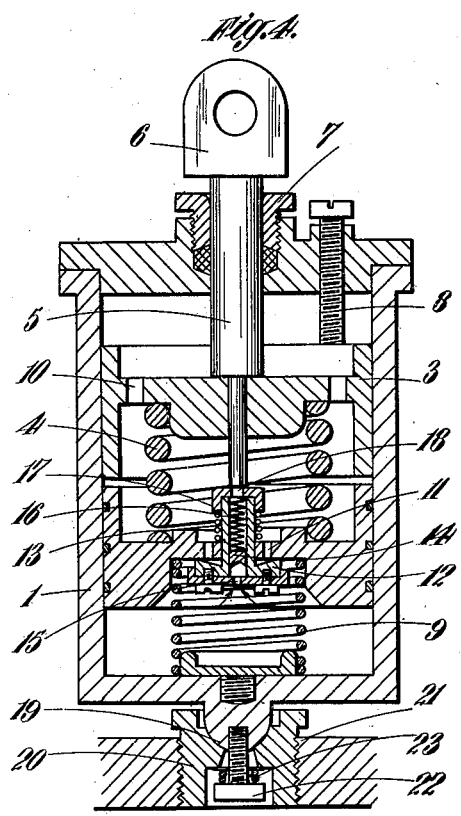
CLUTCH RE-ENGAGING;
OPPOSING SPRING COMPRESSED.
William Hubert Webb
INVENTOR
Attorney

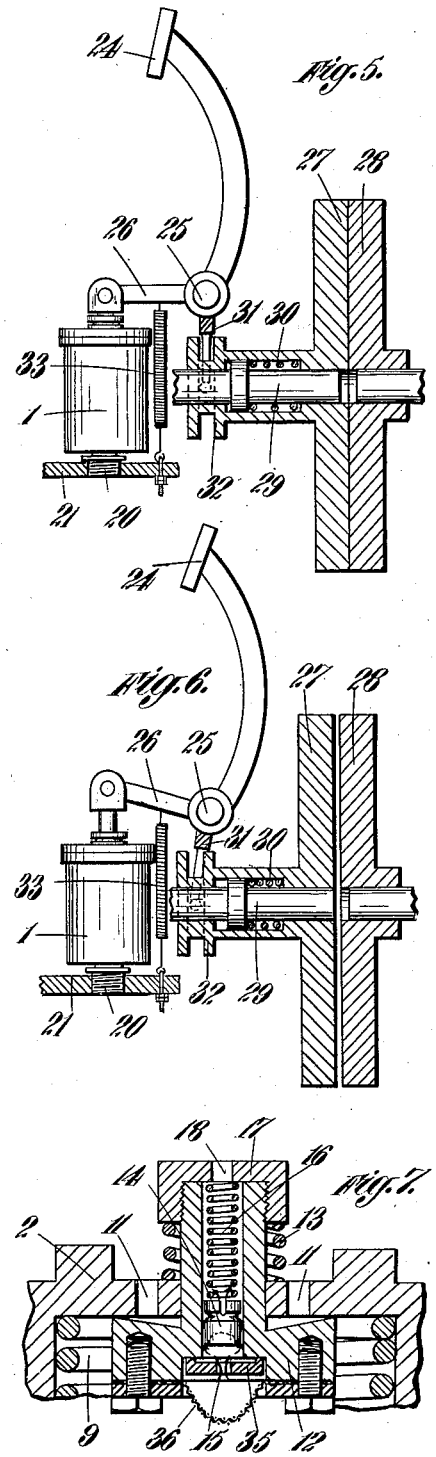

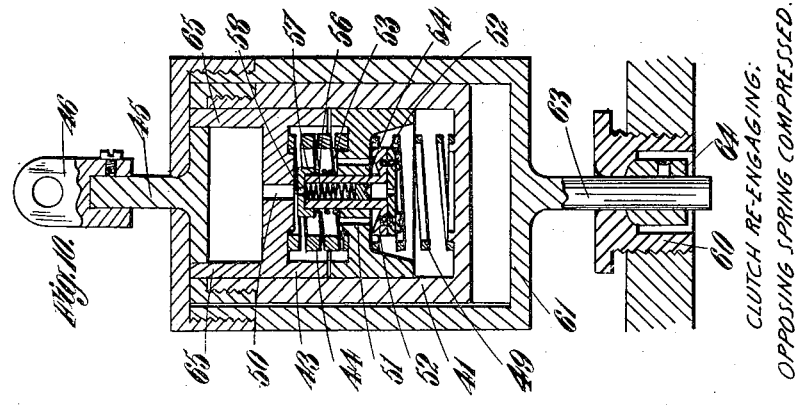
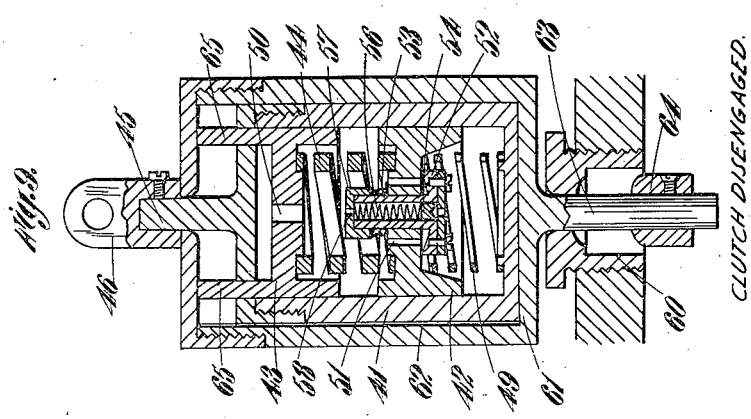
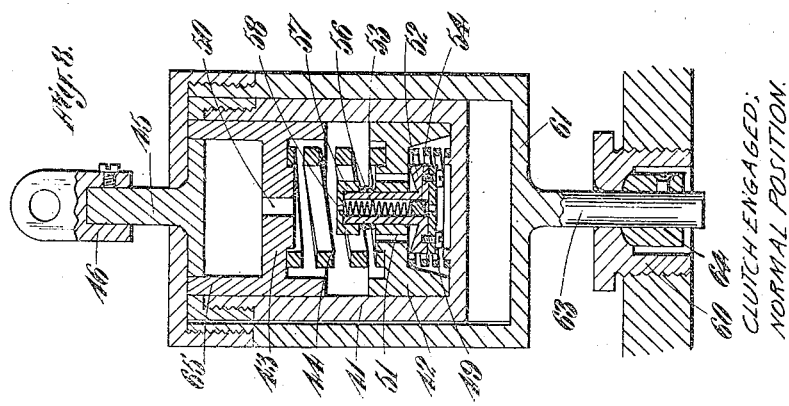

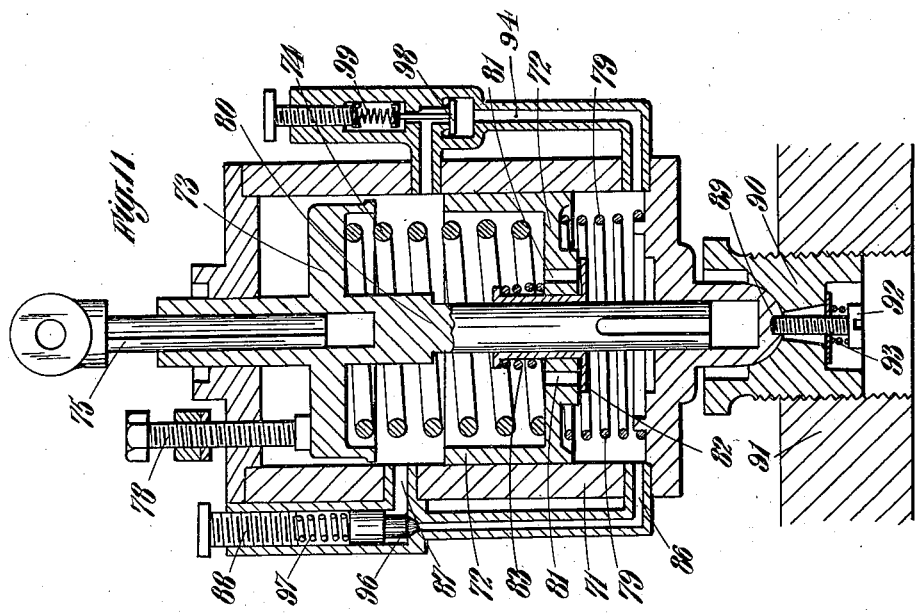

UNITED STATES PATENT OFFICE.

WILLIAM HUBERT WEBB, OF RANDALSTOWN, IRELAND.

CONTROLLING DEVICE FOR POWER-TRANSMISSION CLUTCHES.

1,374,413.     Specification of Letters Patent.     Patented Apr. 12, 1921.

Application filed February 18, 1918. Serial No. 217,980.

*To all whom it may concern:*

Be it known that I, WILLIAM HUBERT WEBB, a subject of the King of Great Britain, and resident of Randalstown, county Antrim, Ireland, have invented certain new and useful Improvements in Controlling Devices for Power-Transmission Clutches, of which the following is a specification.

This invention relates to devices for controlling the engagement of clutches such as are used on automobiles and the like for transmitting the motive power. It is the principal object of the invention to provide an improved device for insuring that the engagement of such clutches shall only take place gradually, so that no sudden seizing and gripping of the clutch parts may be possible.

A further object of the invention is to provide a dashpot device with a resilient expansible and compressible connection between it and the member whose operation is to be controlled, such that the movements of the said member in permitting the engagement of a clutch mechanism are allowed to take place against a resistance which, while allowing of such movements, opposes a pressure to the clutch engagement, such pressure being gradually decreased so as to allow the clutch engagement to become effective in stages at suitable intervals of time.

Another object is to provide a clutch engagement controlling device which, after the clutch has been disengaged, and is to be reengaged, shall allow the return movement of the clutch parts toward the engaging position at first with comparative freedom, but shall then oppose substantial resistance to the exertion of the full engaging pressure, only allowing such pressure to be applied gradually until such time as the driven parts may have been brought into operation.

In order to explain what is intended by the above statement, it may be explained that what I conceive to be required is some device which will allow the clutch surfaces to come back almost at once to the position in which they are in contact, but are only lightly touching one another, and then to control the rate at which the engaging pressure is applied so that the actual engagement is gradual and is properly regulated. It is this result which the device according to the present invention is designed to attain.

The ideal for a friction clutch which ultimately engages with a full pressure of anything from say 65 to 100 kilograms is approximately as follows: The engine and the driving member of the clutch being running, but the driven member of the clutch stationary, when the pedal is released, the engine clutch part should come into contact with the stationary part, but with practically no pressure applied at first, the clutch spring being opposed by a resistance which is at first equal to itself in pressure. This is the first stage. During the second stage, the opposing pressure shall be reduced rapidly until say the clutch spring exerts a pressure on the clutch of 25 kilograms. Up to this point the engine speed will decrease somewhat due to friction on the opposed stationary clutch member. The pressure of the clutch spring can then be allowed to increase rapidly, though not suddenly of course, as a third stage up to say 50 kilograms. During this period, the driving member of the clutch will begin to pick up the driven member and to carry it around slowly with a slipping engagement, owing to the increasing friction, while the engine speed may tend to increase again slightly. Next the critical period or fourth stage of clutch engagement ensues, while the clutch pressure is allowed to increase from say 50 to 65 kilograms. The engine speed again falls off during this critical period as the clutch begins really to grip and to carry the driven mechanism, such as the driving wheels of a car, with it, and the speed of the driven member rapidly increases up to the speed of the driving member as the gripping becomes effective, until finally both parts run at the same speed. There is then a final period or fifth stage, during which the clutch pressure can be increased as rapidly as desired up to the full pressure of say 100 kilograms, while the engine is picking up its full speed and carrying the driven mechanism with it. During this period the whole of the opposing pressure resisting the full engagement of the clutch spring is relieved, and the operation of the clutch is completed. A skilled driver may be able to allow a clutch to engage at the proper speeds and pressures during these periods by gradually releasing the pressure on the clutch pedal or lever, but the action will rarely be perfect, and needless stress and wear on the parts will often result. If these actions could be insured automatically a great improvement would be effected and a large amount of needless stress and wear on the mechanism would be saved as a rule.

The clutch engaging mechanism according to the present invention, which controls the release of pressure as required through these stages of engagement, is designed to attain this result.

The invention is illustrated in the accompanying drawings, in which:—

Figures 1 to 4 are similar views showing in section one form of the gradual engagement device, in four different positions.

Figs. 5 and 6 are two views showing somewhat diagrammatically this device applied to the control of a friction clutch, Fig. 5 showing the clutch engaged, and Fig. 6 showing it disengaged.

Fig. 7 is a detail view showing an improved form of valve for the device of Figs. 1 to 4, drawn to a larger scale.

Figs. 8, 9 and 10 are three views corresponding respectively with Figs. 1, 3 and 4, showing another form of the device designed to operate in a direction opposite to that of the device shown in Figs. 1 to 4.

Fig. 11 is a similar view showing a still further modification.

Referring first to Figs. 1 to 4, the mechanism there shown comprises a cylinder 1 with a piston 2 sliding therein, and a freely sliding member 3 between which and the piston is the main spring 4 of the mechanism. The member 3 in this case serves as an abutment for the spring 4 to act against. A rod 5 serving as the transmission member between the device and the clutch-operating mechanism, passes through a gland 7 at the head of the cylinder, and its head 6 is connected to the clutch operating mechanism in any suitable way. The inner end of this rod has a shoulder by which it can bear on the top of the sliding member 3. A screw stop 8 may be used to limit the upward movement of the member 3, as in Fig. 3, but its use is not essential. Between the base of piston 2 and the cylinder 1 is a light spring 9 which exerts a pressure sufficient to raise the piston 2, spring 4 and slide 3 as in Fig. 3, when they are free to rise unopposed, but the pressure which this spring exerts need only over-balance the weights of these parts by a small amount, its resistance to compression being negligible as compared with that of the main spring 4 and the clutch spring. The main spring 4 when substantially relieved of pressure as in Figs. 1, 2 and 3, will be expanded to the extent indicated, but when compressed as in Fig. 4 it is designed to exert a pressure about equal to that of the clutch spring when the clutch surfaces are just touching but not engaged.

The sliding member 3 has holes in it as at 10 which will allow fluid to pass it fairly freely. The piston 2 has holes at 11 normally closed by a valve 12 whose stem passes through the piston 2 and is drawn up by a spring 13. The stem of the valve 12 is hollow and contains a plug valve 14 which is a loose sliding fit in the stem, and normally seats upon the inner face of valve 12 closing a hole 15 therein. The plug 14 is pressed down by a spring 16 disposed under the head 17 of the valve stem, and a hole 18 in this head allows fluid which passes the plug to escape into the cylinder above the piston 2. The plug 14 is preferably formed with a disk portion at the top thereof which is a sliding fit in the hollow valve stem, and an under portion which is of less diameter than the top portion. An annular groove or neck is formed between the top and bottom portions and communicates with the top side of the plug by means of slots cut in the top of the disk portion. It will be seen that oil can flow past this plug fairly easily. This preferred form of plug is illustrated on an enlarged scale in Fig. 7. The cylinder is filled as fully as possible with a suitable fluid, preferably oil, but it makes no difference to the operation of the device if there is a little free space (or space filled with air) at the top of the cylinder.

Any convenient method may be adopted for mounting the cylinder in position. In Figs. 1 to 4 it is shown as having a rounded lower end 19 which fits in a rounded seat in a screw socket 20. This socket is screwed into any suitable fixed member such as a girder 21 of the frame. A screw pin 22 engaged in the rounded end 19 is drawn down by a spring 23 to keep the rounded surfaces in engagement, and the hole in the base of the socket through which the pin 22 passes is large enough to allow of a little play or rocking movement of the cylinder 1 relatively to the frame member 21.

In Figs. 5 and 6 the device is shown as applied to a clutch operated by a pedal 24. The pedal lever is pivotally mounted at 25, and has an arm 26 which engages with the head 6 of the rod 5. The clutch member 27 is the one directly connected to the engine, while the member 28 is the one connected to the driven part such as the speed gear, Cardan shaft and live axle of the car or the like. The clutch member 27 is feathered on the engine shaft 29 and pressed up by the clutch spring 30. It is drawn back against the action of the clutch spring by an arm or fork 31 of the clutch pedal lever engaging with a collar 32, when the clutch is disengaged. An adjustable spring 33 is shown tending to pull down the arm 26, the adjustment of the tension of this spring serving as a convenient method of adjusting the operation of the parts of the device. It also insures that the pedal is normally held in a position wherein the fork 31 is free in the collar 32, and exerting no pressure therein.

When the pedal 24 is free as in Fig. 5, and the engine is stationary for example, the parts of the mechanism occupy the position of Fig. 1. In this position the spring 9 is compressed, the spring 4 is almost relaxed, the clutch spring 30 holds the clutch parts 27, 28, fully engaged, and the spring 33 at least balances the upward pressure of the spring 9 transmitted through spring 4, slide 3, and rod 5 to the lever 26.

If now the pedal 24 is pressed back to disengage the clutch, the parts are moved to the position of Fig. 6, the rod 5 being raised and spring 33 extended, while clutch member 27 is pulled back and clutch spring 30 compressed. The control mechanism is then momentarily left as in Fig. 2, with the rod 5 withdrawn. Immediately this occurs, the spring 9 begins to expand as it is not held down any longer, and it pushes up bodily the piston 2, spring 4 and slide 3 while oil is displaced freely from above slide 3 through holes 10 to the under side thereof, and through piston 2 through holes 11 as the valve 12 opens readily in a downward direction. The movement continues until the position of Fig. 3 is attained. In this position the slide 3 is against stop 8, but if this stop were omitted, as it may often be, the slide would be at the top of the cylinder and the spring 9 expanded as far as it can be. It does not matter how far the arm 26 and rod 5 may move beyond the point at which the shoulder of rod 5 is clear of the slide 3 in its topmost position; any such movement is independent of the control mechanism of Figs. 1 to 4.

When the clutch pedal 24 is released for reëngaging the clutch, the parts return almost instantaneously to the position of Fig. 5, wherein the clutch part 27 just touches the part 28, while the control mechanism is in the position of Fig. 4. Any risk that the movement might be too sudden, under the inertia of the parts when the pedal is released, is eliminated by the slight dashpost action of the slide 3 as the oil is displaced through the holes 10 therein. The valve 12 will have closed so that oil cannot flow back through holes 11 in the piston 2, but slide 3 is pressed down very quickly under the action of the clutch spring 30 and spring 33. The spring 4 is therefore compressed against the cushion of oil imprisoned beneath piston 2, and this constitutes the first stage of the clutch engagement wherein the whole or practically the whole of the pressure of the clutch spring 30 is relieved by the opposing pressure of spring 4. The second stage follows immediately during which the opposing pressure is somewhat relieved while oil leaks back through hole 15, past plug 14 which is pressed back against the action of its spring 16, and out through hole 18. With this construction the third stage follows under similar conditions while the pressure of spring 4 is gradually relieved and the pressure of clutch spring 30 steadily increases until the clutch begins to grip. At the pressure for this to take place, the pressure of spring 4, and the consequent upward pressure of oil beneath the piston 2, has so far fallen off that spring 16 now closes the plug 14 upon its seat. This brings the device to the fourth stage, in which the relief of the pressure of spring 4 through a comparatively small range must be effected slowly while the clutch is actually gripping and the member 28 with its connected parts is taking up the drive. During the fourth stage the oil leaks past the position 2, past valve 12 and plug 14 comparatively slowly. Generally this leakage is sufficient, but if not, then any additional means of leakage may be provided, which can be permanently open as the leakage can be added to the flow of oil at all other stages without any material difference therein. In the example of construction here shown, the fifth stage, while the clutch is gripping more tightly, follows the fourth stage at approximately the same speed of movement of piston 2, and this does not matter seriously in practice as a rule, because the clutch will hold and drive effectively at the end of the fourth stage, and the fifth is only required to allow of speeding up without slipping. Ultimately, when the spring 4 is fully expanded and spring 9 compressed again, the parts will have returned to the position of Fig. 1. In this position the clutch is fully engaged by its spring 30, while the upward pressure of spring 9 beyond that which supports the weight of the parts resting upon it, is transmitted through spring 4, slide 3 and rod 5 to lever 26 and spring 33, which is adjusted so as to balance or more than balance this pressure.

It might be thought that the plug valve 14 with its spring 16 was unnecessary, and that an adjustment of the stop 8 could be found such that it would allow the slide 3 to rise with the spring 4, and the piston 2 to rise under the action of the spring 9, just to the right height so that on releasing the pedal and allowing the rod 5 to descend, the spring 4 would be compressed precisely to the pressure which would balance that of the clutch spring, and at the right position. It would be difficult to get this adjustment exactly however, and it would be necessary to allow a little latitude on the safe side so that the last movement of the clutch member 27 before actually touching the member 28 would have to be very slow while oil leaked past the piston 2. The plug valve 14 avoids this, and renders the adjustable stop 8 largely unnecessary as no matter how far the piston 2 may move, the parts will return rapidly to the position in which the clutch surfaces are in contact while oil flows past the plug 14. This is the case because if the piston 2 rises a little higher than is necessary, on releasing the pedal the spring 4 is compressed beyond what is necessary to balance the clutch spring, and the plug 14 is raised well away from its seat at the higher pressure, only coming down on its seat so as to make the clutch engagement really slow, when the spring 4 is exerting the pressure which corresponds with the commencing of the driving engagement as before explained.

It would be difficult to provide springs 16 of exactly the right strength, or to adjust the pressure of such springs in all cases so as to make the plug 14 close at the right pressure, but with the arrangement illustrated the spring 16 may be a little stronger than is needed, while the external spring 33 can be adjusted so as to increase the pressure on the rod 5 and therefore on the spring 4 and piston 2, to any required amount which will just allow the plug 14 to come down on its seat under the action of its spring 16 at the right moment for the slowest relief of pressure in the device.

Fig. 7 shows a modified form of valve which also allows of a quick action in the fifth stage of the release of the pressure of spring 4 and the engagement of the clutch. The parts in Fig. 7 are numbered to correspond with Figs. 1 to 4. The shape of valve 12 is modified to accommodate a disk 35 in the center thereof, upon which plug 14 seats, and below this disk is a screen 36 of wire gauze or the like which will catch and hold disk 35 as it falls, and will prevent any solid particles from passing so as to obstruct the plug 14 for example. With this construction, the first stages of the engagement of the clutch take place as before, while disk 35 is held pressed up against the rear face of the valve 12 by the excess pressure of the oil beneath it, and the plug 14 is pressed up against the action of its spring 16 allowing oil to flow fairly freely from beneath the piston 2 to the space above it. This is the case up to and during the fourth stage when the plug 14 closes down upon the disk 35 under the action of its spring 16. At the end of the fourth stage however, the pressure has fallen sufficiently for the disk 35 to be pushed down by the weight of plug 14 and the pressure of its spring 16, and immediately thereafter the oil can flow freely around the disk 35 and around the sides of the plug 14, which is a loose fit in the valve stem in which it slides, so that the fifth stage in which the full clutch pressure is applied after the gradual engagement, can take place comparatively quickly. Fig. 7 shows the device in the third stage, or position of Fig. 4, but its operation in the other positions will be understood readily without further description. The disk 35 would be down or free in the positions of Figs. 1, 2 and 3, and only pressed up during the fourth stage of the return movement from Fig. 4 back toward the position of Fig. 1.

In some cases it may be desired to arrange the device so that it releases on the downward movement of an arm as the clutch is disengaged, and allows a gradual engagement to take place during the upward movement. This is easily allowed for by a reversal of the connections of the members shown in Figs. 1 to 4 for example. Figs. 8 to 10 show such an arrangement while illustrating incidentally some other slight modifications. The parts in Figs. 8 to 10 are numbered from 41 onward to correspond with the parts numbered from 1 onward in Figs. 1 to 4, in so far as there is a correspondence between their functions.

In Figs. 8 to 10, 41 is the cylinder, 42 the piston, 43 the slide, 44 the main spring, 45 the rod, connected in this case to the cylinder 41, 46 the end connected to the clutch-operating member, 49 the releasing spring, 52 the main valve, and 54 the plug. The holes 50 and 51 correspond with the holes 10 and 11 in Figs. 1 to 4, and the parts 53, 56, 57 and 58 also correspond to parts 13 and 16 to 18. Outside the cylinder 41 is a casing 61 in which the cylinder 41 slides freely, channels 62 in the sides of this latter allowing oil or air to pass up and down when the cylinder is pressed down as in Fig. 9, and raised as in Figs. 10 and 8 respectively. The casing 61 has a spindle 63 at the bottom which passes through a fixed socket or guide 60, the upward movement through this latter being limited by a stop 64. Projections 65 on the top of slide 43 passing through slots in the top of the cylinder 41, bear against the cover of the casing 61.

This device operates as follows: In its normal position, shown in Fig. 8, it is pulled up to its fullest extent, by the action of a spring for example corresponding to spring 33 of Figs. 5 and 6, while stop 64 bears upon socket 60, and cylinder 41 is raised, spring 49 being compressed and piston 42 held down by the residual pressure of spring 44. When the clutch is released, the device falls as a whole while stop 64 leaves the fixed socket 60, and then the cylinder 41 is pressed down in casing 61 by rod 45 while spring 49 expands, and oil is displaced from above piston 42 to the under side thereof past valve 52. The position of Fig. 9 is thus reached. When, now, the clutch pedal is released, the member 46, 45 rises until stop 64 again comes against socket 60, and the upward pull on rod 45 lifts the cylinder 41 approximately up to the position of Fig. 10, wherein the piston 42 is still raised in the cylinder and a cushion of oil is imprisoned beneath it, while spring 44 is fully compressed; the pressure of spring 44 is therefore transmitted through piston 42 and this cushion of oil to the bottom of cylinder 41, and so to rod 45 and the clutch mechanism, thus obstructing the operation of the clutch spring in effecting immediate engagement. The pressure of oil on the bottom of cylinder 41 falls off as the oil escapes past the piston around plug 54, while spring 44 expands until the condition of Fig. 8 is reached again, so that the engagement of the clutch is controlled in precisely the same manner as far as the flow of the oil is concerned, as in the case of Figs. 1 to 4. The improved valve of Fig. 7 may also be used in this case to allow of a rapid full engagement in the final stage, and this will require no further explanation. The displacement of air or oil through channels 62 from the top to the bottom of the casing 61, and vice versa, may cushion the action of the device a little, and this may be an advantage.

It will be noticed that there must be some free space in the cylinder 1 when the rod 5 is drawn out as in Fig. 3, or in the cylinder 41 when the ends of the projections 65 are protruding in Fig. 9, or in the casing 61 when the rod 45 is pulled out of it as in Figs. 8 and 10 as compared with Fig. 9. Such space may remain vacuous, or air may be allowed to enter to fill it, and subsequently to escape when the parts return to other positions. As the parts are always in an upright position there is no risk of loss of oil, and as the only part where the oil is subjected to pressure is in the lower part of the cylinder in each case, the devices will operate properly even if some oil is lost.

In the modification shown in Fig. 11 a valve in a by-pass is used to control the flow of the oil, and no valves in the piston member are required, except a single valve to allow of the displacement of oil from above the piston to the space beneath it when the piston is rising freely. The arrangement shown in the drawings, however, is equivalent in function to that shown in Figs. 1–7 combined. Referring to the drawing, Fig. 11, 71 is the cylinder, 72 the piston, 73 the slide which in this case is mounted on or forms part of a central stem 80, 74 is the main spring between the slide and piston, 75 the rod sliding in the head of stem 80, and connected by its head 76 to the clutch operating mechanism, while 78 is the screw stop, and 79 the spring which raises the piston 72 when released. Holes 81 in the piston are normally covered by a sleeve valve 82 drawn up by a spring 83, but opening to allow oil to pass when the piston 72 is pressed up by the spring 79. Two by-passes are shown in this case, the principal one having its lower opening at 86 and its upper opening at 87, while the rate at which oil can pass from opening 86 to opening 87 is controlled by a spring pressed plug valve 96, the spring 97 of which is adjustable in pressure by screw 88 so that the plug valve 96 will close when the pressure beneath the piston has fallen to a certain extent, after which the return flow will be slow. The second by-pass 94 will be referred to below, and its use is not essential. The cylinder is shown as having a rounded end 89 fitting in a screw socket 90 which is adjustable in a fixed support 91, while a pin 92 and spring 93 correspond with pin 22 and spring 23 of Figs. 1 to 4.

In order to secure the action of Fig. 7, another by-pass is shown having a valve 98 normally pressed off its seat by a spring 99, but pressed up against its seat by the excess pressure of oil beneath the piston 72 until the condition is reached in which the disk 35 of Fig. 7 falls. Under that condition of pressure the valve 98 falls under the action of its spring 99 allowing the remaining return flow of oil to take place rapidly while the clutch engages fully in the final stage.

The invention is not limited to the details of construction illustrated, for these are given by way of example only, and may be varied greatly without departing from the spirit and ambit of the invention. Instead of oil as the fluid which is forced past a piston to control the operation of the clutch engagement, any other suitable fluid might be used whose flow could be controlled by similar means to those described. Moreover the term "spring" as herein used for the element 4, Figs. 1 to 4, 44, Figs. 8 to 10, or 74, Fig. 11, includes any equivalent resilient element adapted to be subjected to stress so as to store up and again give out energy, and there is no necessity to describe or illustrate the known equivalents for a spring so used. It will be seen that the cylinder, piston and the valve devices controlling the return movement of the piston after displacement, may be regarded in each case as particular forms of dashpot mechanism, between which and the member whose movements are to be controlled there is interposed a spring which is subjected to stress while allowing the clutch parts to return to their engaging position, such stress being then gradually relieved to allow of the clutch engagement in the required stages of action. The invention is applicable for controlling the engagement of clutch surfaces in machinery generally, and is not limited in its application to automobiles and the like.

Having thus described my invention what I claim as new and desire to secure by Letters Patent is:—

1. A dashpot device for use in controlling the engagement of power transmission clutch mechanism, said dashpot device comprising a cylinder adapted to contain fluid, a piston therein, a valve adapted to open to allow displacement of fluid past the piston as it moves in one direction, but to prevent the passage of the fluid in the other direction, a subsidiary valve adapted to allow the return flow of the fluid slowly when the pressure applied to the piston is comparatively high, and still more slowly when the pressure applied to the piston becomes less, a second additional valve device adapted to allow comparatively rapid return flow of the fluid when the pressure on the piston falls still lower, and mechanism including a resilient element adapted to effect the relative movements of the piston in the cylinder, and to communicate the reactions of said piston to the mechanism to which the dashpot device may be applied.

2. A dashpot device for use in controlling the engagement of power transmission clutch mechanism, said dashpot device comprising a cylinder adapted to contain fluid, a piston therein, a valve adapted to open to allow displacement of fluid past the piston as it moves in one direction, but to prevent the passage of the fluid in the other direction, a subsidiary valve adapted to allow the return flow of the fluid slowly when the pressure applied to the piston is comparatively high, and still more slowly when the pressure applied to the piston becomes less, and mechanism including a resilient element adapted to effect the relative movements of the piston in the cylinder, and to communicate the reactions of said piston to the mechanism to which the dashpot device may be applied.

3. A dashpot device for use in controlling the engagement of power transmission clutch mechanism, said dashpot device comprising a cylinder adapted to contain fluid, a piston therein, a valve adapted to open to allow displacement of fluid past the piston as it moves in one direction only, a valve device operated by the pressure of the fluid and adapted to control the return flow of the fluid past the piston in stages, said valve device comprising elements adapted to allow of relatively rapid return flow at one stage and slower return flow at another stage of the return movement of the piston, and mechanism including a resilient element adapted to effect the relative movements of the piston in the cylinder, and to communicate the reactions of said piston to the mechanism to which the dashpot device may be applied.

4. A dashpot device for use in controlling the engagement of power transmission clutch mechanism said dashpot device comprising a cylinder adapted to contain fluid, a piston therein, a valve adapted to open to allow displacement of fluid past the piston as it moves in one direction only, a valve device operated by the pressure of the fluid and adapted to control the return flow of the fluid past the piston in stages, said valve device comprising elements adapted to allow of relatively rapid return flow at one stage, slower return flow at another stage and then a quicker return flow at a further stage of the return movement of the piston, and mechanism including a resilient element adapted to effect the relative movements of the piston in the cylinder, and to communicate the reactions of said piston to the mechanism to which the dashpot device may be applied.

5. A dashpot device for use in controlling the engagement of power transmission clutch mechanism, said dashpot device comprising a cylinder adapted to contain fluid, a piston therein, a valve adapted to open to allow displacement of fluid past the piston as it moves in one direction, but to prevent the passage of the fluid in the other direction, a subsidiary valve adapted to allow the return flow of the fluid slowly when the pressure applied to the piston is comparatively high, and still more slowly when the pressure applied to the piston becomes less, a transmission member provided with means for connecting it to the mechanism to be controlled, an abutment member against which said transmission member is adapted to abut, a spring operatively interposed between said abutment and said piston member, and separate spring means for moving the piston member in one direction corresponding to that in which the abutment member and spring are free to move when the transmission member is moved to the disengaging position.

6. A dashpot device for use in controlling the engagement of power transmission clutch mechanism, said dashpot device comprising a cylinder adapted to contain fluid, a piston therein, a valve adapted to open to allow displacement of fluid past the piston as it moves in one direction, but to prevent the passage of the fluid in the other direction, a hollow stem on said valve, a spring actuated plunger in said hollow stem, a seating at one end of said hollow stem adapted to seat said plunger, and mechanism including a resilient element adapted to effect the relative movements of the piston in the cylinder, and to communicate the reactions of said piston to the mechanism to which the dashpot device may be applied.

7. A dashpot device for use in controlling the engagement of power transmission clutch mechanism, said dashpot device comprising a cylinder adapted to contain fluid, a piston therein, a valve adapted to open to allow displacement of fluid past the piston as it moves in one direction, but to prevent the passage of the fluid in the other direction, a hollow stem on said valve, a spring actuated plunger in said hollow stem, a movable perforated disk at one end of said hollow stem adapted to move away from said hollow stem on the pressure of the dashpot fluid dropping, with means for limiting the movement of said disk, and mechanism including a resilient element adapted to effect the relative movements of the piston in the cylinder, and to communicate the reactions of said piston to the mechanism to which the dashpot device may be applied.

WILLIAM HUBERT WEBB.